(12) United States Patent
Frey et al.

(10) Patent No.: US 12,330,613 B2
(45) Date of Patent: Jun. 17, 2025

(54) AIRCRAFT BRAKE SYSTEM WITH DISSIMILAR CONTROL DEVICES AND SOFTWARE MODULE USED IN THE EVENT OF A FAULT

(71) Applicant: SAFRAN LANDING SYSTEMS, Velizy-Villacoublay (FR)

(72) Inventors: Olivier Frey, Moissy-Cramayel (FR); Julien Thibault, Moissy-Cramayel (FR); Dominique Onfroy, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 542 days.

(21) Appl. No.: 17/595,682

(22) PCT Filed: May 22, 2020

(86) PCT No.: PCT/FR2020/050859
§ 371 (c)(1),
(2) Date: Nov. 22, 2021

(87) PCT Pub. No.: WO2020/234551
PCT Pub. Date: Nov. 26, 2020

(65) Prior Publication Data
US 2022/0212640 A1 Jul. 7, 2022

(30) Foreign Application Priority Data
May 23, 2019 (FR) ........................................ 1905438

(51) Int. Cl.
*B60T 8/17* (2006.01)
*B60T 8/32* (2006.01)
(Continued)

(52) U.S. Cl.
CPC ............ *B60T 8/1703* (2013.01); *B60T 8/325* (2013.01); *B64C 25/42* (2013.01); *B60T 17/22* (2013.01);
(Continued)

(58) Field of Classification Search
CPC ........ B60T 8/1703; B60T 8/325; B60T 17/22; B60T 2270/402; B60T 2270/404; B60T 2270/413; B64C 25/44
See application file for complete search history.

(56) References Cited

U.S. PATENT DOCUMENTS 6,296,325 B1 * 10/2001 Corio ..................... B60T 8/1703
  318/362
9,227,608 B2 * 1/2016 Hill ........................ B60T 8/1703
(Continued)

FOREIGN PATENT DOCUMENTS

FR     2952009 A1   5/2011
FR     2954753 A1   7/2011
(Continued)

OTHER PUBLICATIONS

French Search Report issued in FR1905438 on Jan. 28, 2020 (4 pages).
(Continued)

*Primary Examiner* — Thomas J Williams
(74) *Attorney, Agent, or Firm* — Bookoff McAndrews, PLLC (57) ABSTRACT

An aircraft brake system comprising:
  a first group of at least one electromechanical actuator,
  a second group of at least one electromechanical actuator,
  a first control device with a first software module and a second software module, the second software module being configured to control the first group of at least one actuator at least in the event of a fault of the first software module,
(Continued)

a second control device with a third software module and a fourth software module, the fourth software module being configured to control the second group of at least one actuator at least in the event of a fault of the third software module, wherein the first device module and the second control device are dissimilar.

The invention also relates to an aircraft equipped with this system.

14 Claims, 4 Drawing Sheets

(51) Int. Cl.
    *B60T 17/22* (2006.01)
    *B64C 25/42* (2006.01)
    *B64C 25/44* (2006.01)

(52) U.S. Cl.
    CPC ... *B60T 2270/404* (2013.01); *B60T 2270/413* (2013.01); *B64C 25/44* (2013.01)

(56) References Cited

U.S. PATENT DOCUMENTS

| | | | | |
|---|---|---|---|---|
| 2006/0108864 A1* | 5/2006 | Evans | ................... | B60T 8/1703 |
| | | | | 701/70 |
| 2008/0150353 A1* | 6/2008 | Griffith | ..................... | B60T 7/12 |
| | | | | 477/208 |
| 2008/0258548 A1 | 10/2008 | May et al. | | |
| 2008/0296106 A1* | 12/2008 | Nilsson | ................... | B60T 8/345 |
| | | | | 701/115 |
| 2009/0278401 A1* | 11/2009 | Summers | ................ | B60T 17/22 |
| | | | | 303/20 |
| 2010/0280725 A1* | 11/2010 | Cahill | ................... | B60T 17/221 |
| | | | | 701/70 |
| 2011/0155521 A1* | 6/2011 | Thibault | ............... | B60T 8/1703 |
| | | | | 188/106 P |
| 2013/0268798 A1* | 10/2013 | Schade | ............... | G06F 11/1641 |
| | | | | 714/38.1 |
| 2015/0128689 A1* | 5/2015 | Cahill | ...................... | G01K 3/00 |
| | | | | 73/121 |
| 2015/0151728 A1* | 6/2015 | Iordanidis | ............... | B64C 25/44 |
| | | | | 701/3 |
| 2015/0291279 A1* | 10/2015 | Iordanidis | ............... | B60T 8/885 |
| | | | | 188/156 |
| 2015/0291280 A1* | 10/2015 | Iordanidis | ............... | B64C 25/44 |
| | | | | 244/111 |
| 2018/0022446 A1* | 1/2018 | Bonigen | ................. | B64C 25/34 |
| | | | | 701/3 |
| 2019/0184951 A1* | 6/2019 | Frey | ..................... | B60R 16/0215 |
| 2022/0212640 A1* | 7/2022 | Frey | ....................... | B60T 8/325 |

FOREIGN PATENT DOCUMENTS

FR            3054201 A1      1/2018
WO      2008144378 A1      11/2008

OTHER PUBLICATIONS

International Search Report issued in PCT/FR2020/050859 on Oct. 7, 2020 with English Translation (4 pages).

\* cited by examiner

AIRCRAFT BRAKE SYSTEM WITH DISSIMILAR CONTROL DEVICES AND SOFTWARE MODULE USED IN THE EVENT OF A FAULT

CROSS-REFERENCE TO RELATED APPLICATIONS

This patent application is the U.S. National Stage entry under 35 U.S.C. § 371 of International Patent Application No. PCT/FR2020/050859, filed on May 22, 2020, which claims the benefit of priority to French Patent Application No. 1905438, filed on May 23, 2019.

TECHNICAL FIELD

The invention relates to the general field of braking of aircraft and more precisely to electrical braking.

The invention relates more particularly to systems which control electromechanical actuators used for braking.

PRIOR ART

Aircraft can be equipped with electrical brake systems. These brake systems use electromechanical actuators which can be controlled to slow the wheel for which they are mounted on the brakes.

Generally, a high level of safety is desired for brake systems. In particular, it is desired to reduce the impact of faults well known to a person skilled in the art as "common mode failures", characterized by the simultaneous appearance of a fault in several elements of a system as a consequence of a single cause. These common mode failures can affect the simple elements of a system and more complex elements, the more complex elements being more subject to these common mode failures.

It has therefore been proposed to implement supplementary equipment (emergency equipment) which is redundant with the equipment used for normal operation (normal equipment) and which is activated in the event of failure of the normal equipment. The design and/or the manufacture of the emergency equipment is different from that of the normal equipment in order to avoid the risk of the appearance of a common mode failure and to increase the durability of the systems in the aircraft. The main disadvantage of these solutions is its impact on the mass of the aircraft.

In the prior state of the art, document FR 2 952 009 is known, which described the use of controllers which control only two electromechanical actuators for a wheel equipped with four electromechanical actuators. The system of this document is an "active/active" system, according to an expression well known to a person skilled in the art, which has the advantage of having a reduced mass. On the other hand, this document does not address common mode failures.

Also known is document FR 2 954 753, which proposes the implementation of a dissimilarity (same function but presenting structural differences) in an emergency chain. The system of this document is of the "active/passive" type, according to another expression well known to a person skilled in the art. The solution of this document is not satisfactory as regards the mass of the system. Also, document FR 3 054 201 describes another solution which is also not satisfactory and which uses dissimilar braking control modules.

The invention seeks in particular to mitigate these disadvantages.

DISCLOSURE OF THE INVENTION

To this end, the invention proposes an aircraft brake system comprising:
- a first group of at least one electromechanical actuator able to apply a braking force to slow at least one wheel of the aircraft (for example, said at least one wheel being equipped with at least the actuator of the first group),
- a second group of at least one electromechanical actuator able to apply a braking force to slow said at least one wheel of the aircraft (for example, said at least one wheel being equipped with at least the actuator of the second group),
- a first control device configured to control the first group of at least one actuator by means of a first software module and a second software module, the second software module being configured to control the first group of at least one actuator at least in the event of a fault of the first software module,
- a second control device configured to control the second group of at least one actuator by means of a third software module and of a fourth software module, the fourth software module being configured to control the second group of at least one actuator at least in the event of a fault of the third software module, in which the first control device and the second control device are dissimilar.

According to a general characteristic, the second software module differs from the first software module in that:
  it includes a smaller number of inputs, and/or
  it includes a smaller number of outputs, and/or
  it includes a smaller number of functionalities,
and/or in which the fourth software module differs from the third software module in that:
  it includes a smaller number of inputs, and/or
  it includes a smaller number of outputs, and/or
  it includes a smaller number of functionalities, Thus, the invention proposes to use both a dissimilarity between the control devices (for example the hardware control devices, which can comprise hardware components), and a software emergency solution. This solution is advantageous in terms of mass because the addition of a software emergency solution (the second and fourth software modules) has no impact on the mass of the aircraft, and it allows obtaining good durability.

Here, two control devices are used in a solution called "active/active" because these two devices are intended to be used simultaneously for the control of the actuators of the same wheel; it is also noted that in the proposed system, these two control devices are dissimilar.

The use of software modules intended to operate in the event of a fault in another software module is a solution called "active/passive", because the second and fourth software modules are not in operation (they are therefore passive) when the first and third modules are not faulty. The invention therefore proposes a system which is both "active/active" (for the control devices) and "active/passive" (for the software modules), according to these expressions which are well known to a person skilled in the art.

Here, the first software module and the third software module control respectively the first and the second group of at least one actuator for their normal operation.

In addition, it can be noted that the first control device and the second control device both comprise an electronic system structure comprising in particular a processor, a non-volatile memory and/or a volatile memory. A person skilled in the art will know how to obtain two dissimilar electronic systems.

In fact, the risk of a common mode failure in elements of identical design or manufacturing is a known notion of the ARP4761 standard of the professional association SAE International in its 1996 version.

Thus, the first group can comprise two (or more) electromechanical actuators able to apply a braking force to slow one or more wheels of the aircraft, and the second group can comprise two (or more) electromechanical actuators able to apply a braking force to slow said one or more wheels of the aircraft.

The reduction in the number of inputs, of outputs and/or of functionalities allows simplifying the operation of the second and fourth software modules. As a result, the test or validation phase of the second and fourth software modules can be exhaustive (all combinations of inputs and possible states can be tested), which allows obtaining good durability.

It is possible to note that these differences can also correspond to a smaller number of operating points for the second and/or the fourth software module.

It is possible to note that this or these reductions lead to obtaining operation in an operating mode called the degraded mode.

For example, the second and/or the fourth software module may not be configured to execute a function to prevent the locking of the wheel.

Preferably, the second and/or the fourth software module are configured for the execution of function allowing the application by the brake actuators of a force providing a minimum braking performance while minimizing the risk of locking of the wheel, this force providing a minimum braking performance can be defined in advance, for example by means of test or calibration phases. The application of the force providing a minimum braking performance can be considered as a basic function. Other functions not absolutely necessary for braking, typically optimization, comfort or maintenance functions, are not provided by the second and/or fourth software module in order to simplify the second and/or the fourth software module. The second and the fourth software modules therefore have functionalities which are reduced to the strict necessary functional minimum.

In fact, the second and/or the fourth software module provide minimum or essential operation of the electromechanical actuators.

According to a particular embodiment, the first control device and the second control device have at least a structural difference. This, for example, allows the dissimilarity to be obtained.

In particular, the first control device and the second control device can have one or more differences selected from the list comprising: different architectures (different CPU architectures, different arrangements of components, the use of different registers, the use of different inputs and outputs), different technologies (analog/digital components, flash/EEPROM memories, TTL/MOS transistors, ceramic/electrolytic capacitors, different fineness of the etching), different designs, (different design rules/methods), different manufacturing chains (different manufacturing methods, different component lots or materials, different machine adjustments/drifts). Typically, microcontrollers from different suppliers will be defined by different designers and manufactured on different chains, minimizing the risk of a common design or manufacturing error.

These differences will allow avoiding common mode failures.

According to one particular embodiment, the first software module and the second software module can also be executed, for example, by the same hardware member (for example a processor belonging to the first control device) in a manner that is isolated from one another, and/or the third software module and the fourth software module can also be executed, for example, by the same other hardware member (for example another processor of the second control device) in a manner that is isolated from one another.

This particular embodiment can be implemented by using two software partitions, respectively for the first/third and second/fourth modules, of which the execution can be activated or deactivated independently from one another by the task manager of the processor of the control device.

This makes it possible in particular to ensure that in the event of locking of the first software module or of the third software module (for example if they execute an infinite loop), it is possible to execute the second software module and the fourth software module to control the electromechanical actuators.

According to one particular embodiment the first control device and the second control device are respectively supplied with electrical energy by two different electrical power supply lines.

In addition, this particular embodiment allows having redundancy in the electrical energy supply.

According to one particular embodiment, the system comprises a first module for transmitting control signals to the first control device and to the second control device, and a second module for transmitting control signals to the first control device and to the second control device configured to be used in the event of a fault in the first control signal transmission module.

This particular embodiment further improves the durability of the system.

According to a particular embodiment, the first control device comprises a first module for monitoring the operation of the first control device, and the second control device comprises a second module for monitoring the operation of the second control device, dissimilar to the monitoring module.

By way of indication, the monitoring module can allow controlling the proper operation of the control device, typically by analyzing the consistency of the set points received via the first and second control signal transmission modules mentioned above and the outputs of the software modules. In the event of detection of an operating fault during the operation of the first software module, the monitoring module the monitoring module can order a reconfiguration (called an internal reconfiguration) by activating the second software module, which substitutes itself for the first software module to control the brake actuators (in the case where the fault in question is a fault of the software and not a hardware fault; if the fault is in hardware, the software reconfiguration has no effect). In the event of detection of a fault and/or of reconfiguration, it informs the other systems and the pilot (typically to warn him of a reconfiguration into a degraded mode).

This particular embodiment also improves the durability of the system.

According to one particular embodiment, the second software module is also configured to control the first group of at least one actuator, instead of the first software module, after the first control device has received or generated a command to switch between the first and the second software module, and/or the fourth software module is also configured to control the second group of at least one actuator instead of the third software module after the second control device has received or generated a command to switch between the third and the fourth software module.

In this particular embodiment, the switching commands can have been emitted by a user through a human-machine interface (in this case the command is received). Alternatively, they can have been emitted by a monitoring module which monitors whether the first or the third software module is faulty (in this case, the command is generated, for example within the scope of an internal reconfiguration).

According to one particular embodiment, the first control device and the second control device form a first unit for braking said at least one wheel, the system also comprising at least one second unit for braking said at least one wheel or at least one other wheel, the first brake unit and the second brake unit being identical.

The invention is in no way limited to two brake units and also applies to aircraft equipped with more than two wheels.

In particular, the invention also applies to a brake unit which controls actuators on two wheels. For example, the first group can comprise at least two electromechanical actuators able to apply braking forces to slow two wheels of the aircraft, and the second group can comprise at least two electromechanical actuators able to apply braking forces to slow two wheels of the aircraft, and the second group can comprise at least two electromechanical actuators able to apply braking forces to slow these same two wheels of the aircraft.

If the aircraft is equipped with two brake units, their actuator groups of at least two actuators can be distributed over two wheels. Thus, the failure of a braking unit allows retaining the capacity to brake on two wheels rather than on a single wheel.

The invention also proposes an aircraft equipped with a brake system as defined above.

BRIEF DESCRIPTION OF THE DRAWINGS

Other features and advantages of the present invention will be revealed by the description given below, with reference to the appended drawings which illustrate one exemplary embodiment of it lacking any limiting character. In these figures.

DESCRIPTION OF THE EMBODIMENTS

A brake system for an aircraft according to one example will now be described.

This brake system is suited for electrical braking and it allows obtaining good durability with respect to failures of the components of the system, and in particular with respect to common mode failures.

This system is both of the active/active type (for the devices which comprise hardware elements) and of the active/passive type (for software modules), according to expressions well known to a person skilled in the art which apply to types of redundancies:

active/active: two elements are provided to provide the same function and are simultaneously active when the system operates nominally;

active/passive: a first element is provided for nominal operation and a second element is provided for operation in the event of a fault in the first (emergency mode).

Figure 1:
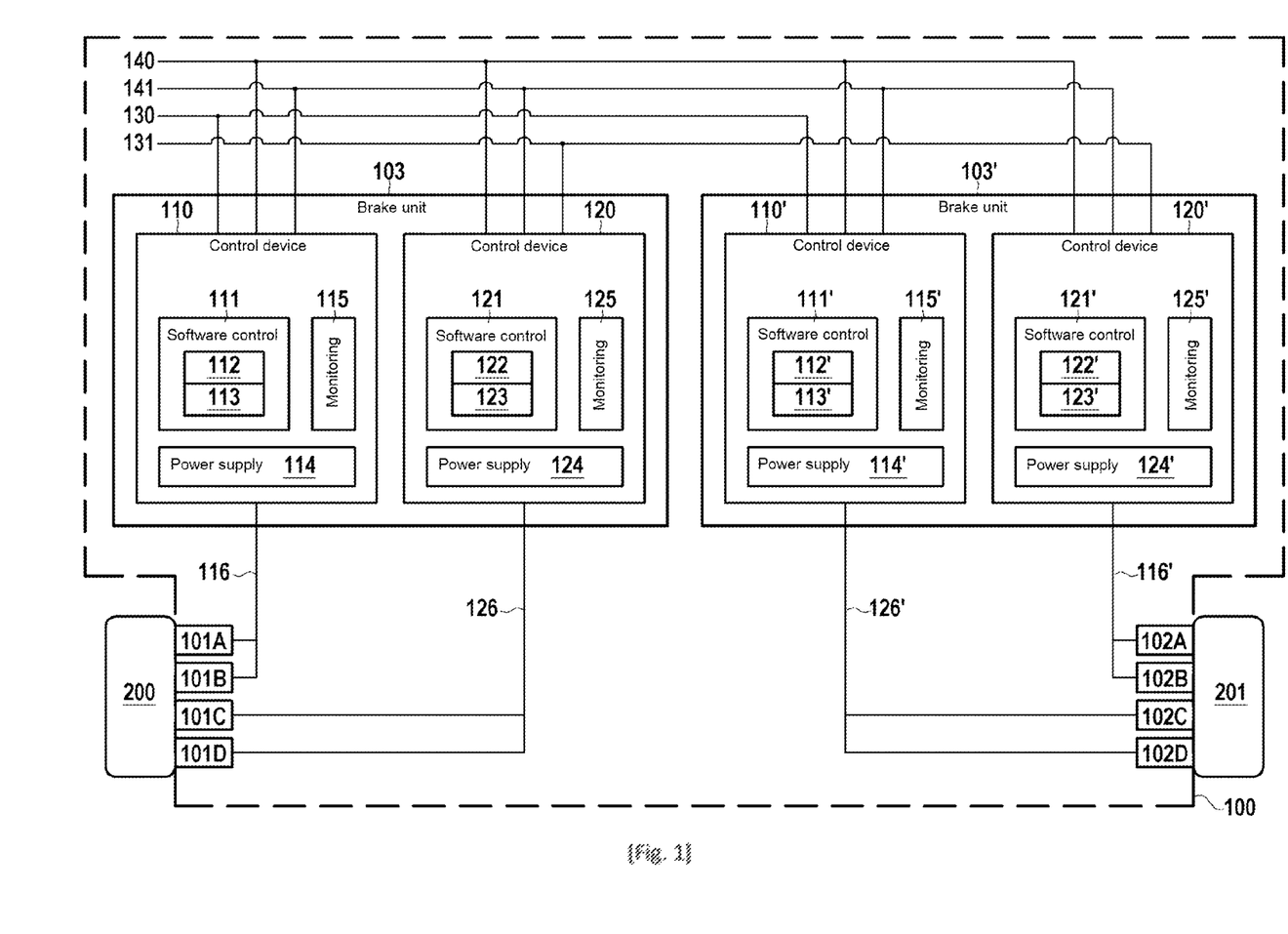
FIG. 1 illustrates schematically a brake system according to one example.

In FIG. 1, a system 100 according to one example is shown. This system allows controlling the braking of two wheels 200 and 201 of a landing gear of an aircraft. The system 100 is configured to supply electrical energy and to control the operation of electromechanical actuators configured to slow the wheels 200 and 201. Here, the wheel 200 is equipped with four electromechanical actuators 101A, 101B, 101C and 101D and the wheel 201 is equipped with four electromechanical actuators 102A, 102B, 102C, and 102D.

The invention is in no way limited to the braking of two wheels, and can be adapted to the braking of more than two wheels of an aircraft.

The actuators of the same wheel are controlled by a brake unit which belongs to the wheel. As a result, in the figure, two brake units are shown: one brake unit 103 associated with the wheel 200 and with its electromechanical actuators 101A to 101D, and one braking unit 103' associated with the wheel 200 and with its electromechanical actuators 102A to 102D.

Hereafter, the brake unit 103 will be described. The brake unit 103' is identical to the brake unit 103 and its identical elements bear the same numerical references as the elements of the brake unit 103 but with the notation "'" following the numerals.

The brake unit 103 comprises a first control device 110 and a second control device 120. The first control device 110 is associated with the electromechanical actuators 101A and 101B (which form a first group of electromechanical actuators), and the second control device 120 is associated with the electromechanical actuators 101C and 101D (which form a second group of electromechanical actuators).

It is understood that the two control devices 110 and 120 are in an active/active configuration. A fault in one of the two devices does not prevent all braking of the wheel, because the non-faulty control device can provide braking with at least two electromechanical actuators.

To avoid common mode failures for the devices 110 and 120, i.e. failures which have the same cause, the control devices 110 and 120 are dissimilar.

The first control device 110 and the second control device 120 have at least a structural difference. For example, this difference can be selected from the list comprising: different CPU architectures, different arrangements of components, the use of different inputs and outputs, different design rules/methods, different manufacturing chains, different component lots.

In the control device 110, a software control member 111 has been provided, typically including a microcontroller, comprising two distinct software modules. It comprises in particular a first software module 112 which allows operating normal control of the electromechanical actuators 101A and 101B. This first software module is a complex software, which has numerous inputs, numerous outputs and numerous functionalities (for example to prevent the locking of the wheels or maintenance modes).

The software control member also includes a second software module 113 which also allows operating control of the electromechanical actuators 101A and 101B. This second software module 113 is in particular configured to control these actuators in the event of a fault in the first software module 112. Preferably, the second software module is less complex software than the first software module 112: it has fewer inputs, outputs and functionalities. For example, it may not be capable of implementing the prevention of locking of the wheels ("anti-skid") or certain maintenance modes. It will be noted in particular that if the functionality which prevents the locking of the wheels is not implemented by the second software module 113, the latter can be configured to control the electromechanical actuators so that they can only apply a limited level of braking (which also prevents the locking of the wheels).

It is understood in particular that the second software module is particularly durable, because it may have been tested or validated for all possible inputs. On the other hand, it causes the actuators to operate in a degraded mode. It will be noted that the simplicity of this software allows avoiding the appearance of design errors which could affect this software module, and therefore avoiding the appearance of common mode failures which can affect all the instance of this simple software module in the system.

It can be noted that the two software modules can be executed in a manner isolated from one another: the failure of one will not affect the other which can be executed.

It can be noted that the two software modules 112 and 113 are in an active/passive configuration: the second software module 113 being passive when the first software module 112 is active.

The control device 110 also includes a power supply management module 114 which provides for the distribution of electrical energy and the control of actuators based on commands elaborated by the first or by the second software module.

It also includes a module for monitoring the operation of the control device 110. This module has functions which are traditionally designated by the expression "monitoring."

Thus, control of the electromechanical actuators 101A and 101B is obtained by an electrical connection 116, to transmit electrical energy to the electromechanical actuators.

In the second control device 120, dissimilar to the first control device 110, there is also a software control member 121. Preferably, this member comprises a third software module 122 which can be analogous to the software module 112, and a fourth software module 123 which can be analogous to the software module 113 (by analogous, it should be understood that their code is identical).

Even if the software modules are analogous as explained above, the hardware elements used to implement the members 111 and 121 can be dissimilar.

On the other hand, the second control device includes an electrical power supply management module 124 which can have dissimilarities with the electrical power supply management module 114 (even if it has the same function).

The second control device also includes a module 125 for monitoring the operation of the control device 120, which can have dissimilarities with the monitoring module 115 even though it has the same function.

Thus, the control of the electromechanical actuators 101C and 101D is obtained by an electrical connection 126, to transmit electrical energy to the electromechanical actuators.

As regards the supply of electrical energy, the first control device and the second control device are respectively supplied by two different power supply lines 130 and 131, distinct from one another (in an active/active configuration).

To control the control devices, a first module for transmitting control signals 140 is used (a digital bus for example) and a second module for transmitting control signals 141 (for example another digital buss or a member which delivers analog and/or discrete signals) which is configured to be used in the event of a fault of the first control signal transmission module. All the control devices receive the control signals from the two control signal transmission modules.

For example, for the control device 110, it is possible to use the first control signal transmission module 140 for the first software module 112 and the second control signal transmission module 141 for the second software module 113.

It will be noted moreover that the control signal transmission module 140 and/or the control signal transmission module 141 can supply these control signals to the monitoring modules 115 and 125. This allows verifying whether an inconsistency appears between these signals (which are set points) and the outputs of the software control members.

As explained above, the brake unit 103' is analogous to the brake unit 103; it will therefore not be described in more detail for reasons of conciseness.

Figure 2:
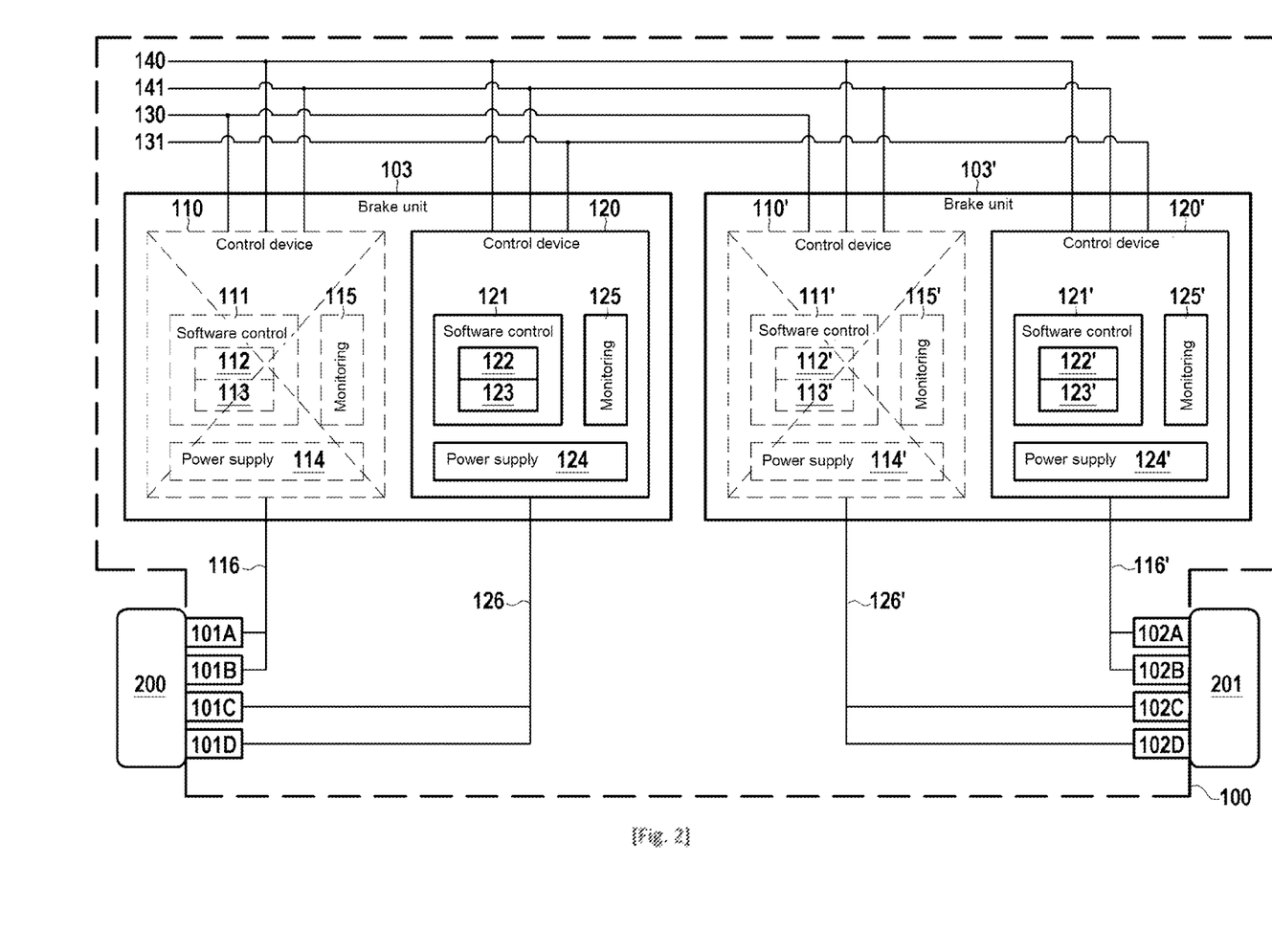
FIG. 2 illustrates a common mode failure of a control device.

In FIG. 2, the failure of the first control devices 110 and 110' is shown; this event being able to occur in the event of a common mode failure.

Braking remains possible because the second control devices 120 and 120' remain operational because they are normally not affected by the same failures as the first control device 110 and 110'. It will be noted, however, that only two actuators per wheel remain usable.

Figure 3:
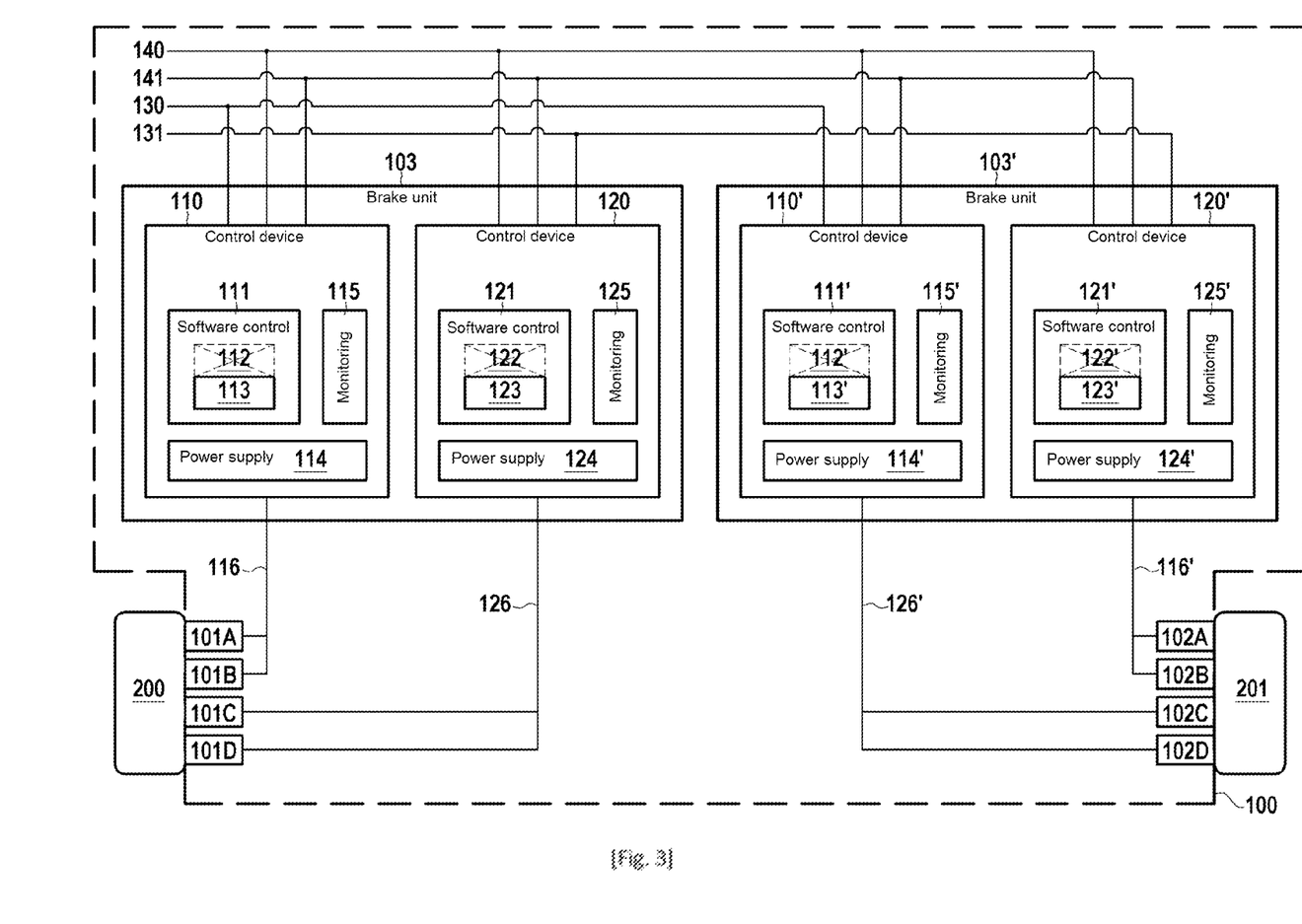
FIG. 3 illustrates a common mode failure which applies to software modules.

In FIG. 3, the failure of the first software modules 112 and 112' are shown, and of the third software modules 122 and 122', in a case where these two modules are identical. If they are identical, they can be affected by a common mode failure.

It will be noted that if a fault of this type occurs, the monitoring modules 115, 125, 115' and 125' can detect it and command switching between the software modules so that the software modules 113, 123, 113' and 123' are used (alternatively, this switching can be accomplished by a user who emits a command for this purpose).

In this example, a degraded braking operation occurs.

Figure 4:
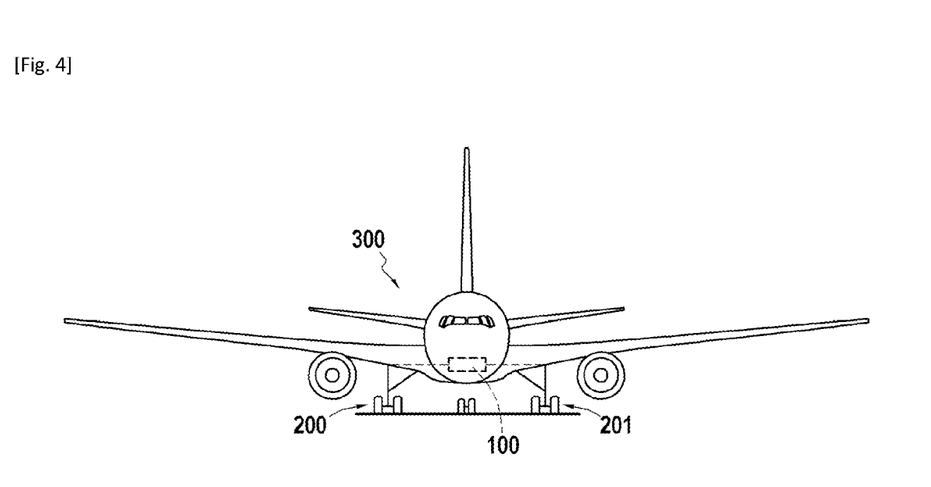
FIG. 4 illustrates an aircraft according to one example.

In FIG. 4, and aircraft 300 is shown, equipped with a brake system 100 identical to that described with reference to FIG. 1, and which manages the braking of wheels 200 and 201.

The implementation modes and embodiments described above allow obtaining a good braking durability, this while limiting the quantity of hardware redundancies, because software redundancies are used (the two software modules in each software control member).

The invention claimed is:

1. An aircraft brake system comprising:
   a brake unit comprising a first control device and a second control device, wherein the first control device includes a first monitoring module and the second control device includes a second monitoring module,
   a first group of at least one electromechanical actuator able to apply a braking force to slow at least one wheel of the aircraft, and
   a second group of at least one electromechanical actuator able to apply a braking force to slow said at least one wheel of the aircraft,
   wherein the first control device is configured to control the first group of at least one actuator by means of a first software module and a second software module, the second software module being configured to control the first group of at least one electromechanical actuator at least in an event of a fault of the first software module, wherein the second control device is configured to control the second group of at least one actuator by means of a third software module and a fourth software module, the fourth software module being configured to control the second group of at least one electromechanical actuator at least in an event of a fault of the third software module, wherein the first control device and the second control device have at least a structural difference, wherein the second software module differs from the first software module in that:
the second software module includes a smaller number of inputs, and/or
the second software module includes a smaller number of outputs, and/or
the second software module includes a smaller number of functionalities, and/or wherein the fourth software module differs from the third software module in that:
the fourth software module includes a smaller number of inputs, and/or
the fourth software module includes a smaller number of outputs, and/or
the fourth software module includes a smaller number of functionalities.

2. The system according to claim 1, wherein the first software module and the second software module can also be executed in a manner that is isolated from one another, and/or wherein the third software module and the fourth software module can also be executed in a manner that is isolated from one another.

3. The system according to claim 1, wherein the first control device and the second control device are respectively supplied with electrical energy by two different electrical power supply lines.

4. The system according to claim 1, comprising a first control signal transmission module for transmitting control signals to the first control device and to the second control device, and a second module for transmitting control signals to the first control device and to the second control device configured to be used in the event of a fault in a first control signal transmission module.

5. The system according to claim 1, wherein the first control device comprises the first monitoring module for monitoring an operation of the first control device, and the second control device comprises the second monitoring module for monitoring the operation of the second control device, wherein the first monitoring module is configured to receive a first control signal from a first control signal transmission module and to check for an inconsistency in the first control signal, and wherein the second monitoring module is configured to receive a second control signal from a second control signal transmission module and to check for an inconsistency in the second control signal.

6. The system according to claim 1, wherein the second software module is also configured to control the first group of at least one actuator, instead of the first software module, after the first control device has received or generated a command to switch between the first and the second software module, and/or the fourth software module is also configured to control the second group of at least one actuator instead of the third software module after the second control device has received or generated a command to switch between the third and the fourth software module.

7. The system according to claim 1, wherein the first control device and the second control device form a first brake unit for braking said at least one wheel, the system also comprising at least one second brake unit for braking said at least one wheel or at least one other wheel, the first brake unit and the at least one second brake unit being identical.

8. An aircraft comprising a brake system comprising:
a brake unit comprising a first control device and a second control device, wherein the first control device includes a first monitoring module and the second control device includes a second monitoring module,
a first group of at least one electromechanical actuator able to apply a braking force to slow at least one wheel of the aircraft, and
a second group of at least one electromechanical actuator able to apply a braking force to slow said at least one wheel of the aircraft,
wherein the first control device is configured to control the first group of at least one electromechanical actuator by means of a first software module and a second software module, the second software module being configured to control the first group of at least one electromechanical actuator at least in an event of a fault of the first software module,
wherein the second control device is configured to control the second group of at least one electromechanical actuator by means of a third software module and of a fourth software module, the fourth software module being configured to control the second group of at least one electromechanical actuator at least in an event of a fault of the third software module,
wherein the first control device and the second control device have at least a structural difference,
wherein the second software module differs from the first software module in that:
the second software module includes a smaller number of inputs, and/or
the second software module includes a smaller number of outputs, and/or
the second software module includes a smaller number of functionalities,
and/or wherein the fourth software module differs from the third software module in that:
the fourth software module includes a smaller number of inputs, and/or
the fourth software module includes a smaller number of outputs, and/or
the fourth software module includes a smaller number of functionalities.

9. The aircraft according to claim 8, wherein the first control device includes a first power supply management module configured to distribute electrical energy to the first group of the least one electromechanical actuator, and wherein second control device includes a second power supply management module configured to distribute electrical energy to the second group of the least one electromechanical actuator.

10. The aircraft according to claim 9, wherein the first software module and the second software module can also be executed in a manner that is isolated from one another, and/or wherein the third software module and the fourth software module can also be executed in a manner that is isolated from one another.

11. The aircraft according to claim 10, wherein the brake system further comprises a first control signal transmission module for transmitting control signals to the first control device and to the second control device, and a second control signal transmission module for transmitting control signals to the first control device and to the second control device configured to be used in the event of a fault in a first control signal transmission module.

12. The aircraft according to claim 11, wherein the first monitoring module is configured to monitor operation of the first control device, the second monitoring module is configured to monitor operation of the second control device, wherein the first monitoring module is configured to receive a first control signal from the first control signal transmission module and to check for an inconsistency in the first control signal, and wherein the second monitoring module is configured to receive a second control signal from the second control signal transmission module and to check for an inconsistency in the second control signal.

13. The aircraft according to claim 12, wherein the second software module is also configured to control the first group of at least one actuator, instead of the first software module, after the first control device has received or generated a command to switch between the first and the second software module, and/or the fourth software module is also configured to control the second group of at least one actuator instead of the third software module after the second control device has received or generated a command to switch between the third and the fourth software module.

14. The aircraft according to claim 13, wherein the brake system further comprises at least one second brake unit for braking said at least one wheel or at least one other wheel of the aircraft.

* * * * *